3,546,322
REDUCTION OF OXYGEN FUNCTIONS IN GRAFT COPOLYMERS
Tad L. Patton, Baytown, Tex., assignor to Esso Research and Engineering Company
No Drawing. Filed Apr. 26, 1967, Ser. No. 633,699
Int. Cl. C08f 27/24
U.S. Cl. 260—878                        6 Claims

ABSTRACT OF THE DISCLOSURE

A process for reducing the oxygen functions in graft copolymers or oxidized polymer which comprises treating the polymer with a reducing agent in a water slurry.

BACKGROUND OF THE INVENTION

Heretofore, the most common method used in the graft copolymerization of polyolefins has been the use of radiation techniques. The initial step of oxidizing the polyolefins, using radiation or other means, has been accompanied by the overoxidation and degradation of substantial portions of the polyolefins in the attempt to achieve some oxidation on the total mass of the polyolefin. Radiation techniques have been used in an attempt to introduce as little oxygen into the polymer as possible since not only are the desired hydroperoxide groups formed but the process is accompanied by the formation of peroxides, ketones, aldehydes, acids, etc. When ozone is used as an oxidant, ozonides are also formed. The presence of these oxygen functions formed on the polymer chain are destructive to the polymer and cause destructive degradation of the polymer at extrusion temperatures. Oxygen functional groups may remain in sufficient concentration even after graft copolymerization such that the graft copolymer cannot be extruded to form useful products but will form brittle fibers and pads.

SUMMARY OF THE INVENTION

The present invention overcomes the problems of the prior art by providing a simple and efficient process for the reduction of oxygen functional groups on polymer by treating the oxygenated polymer in an aqueous solution of a reducing agent.

The present invention may be briefly described as a process for treating polymers and copolymers of alpha olefins having oxygenated functional groups chemically attached to the polymer to eliminate the harmful effects when the polymer is in the form of a powder or pellet and is to be used in the manufacture of articles, films, fibers and the like.

More specifically, the process of the present invention comprises mixing the oxygenated polymer in an aqueous solution of a reducing agent. The oxygenated polymer may be a polyolefin oxidized by using an ozone-oxygen gas mixture in a water slurry and thereafter having a polar monomer which polymerizes by a free-radical mechanism grafted thereto. It has been found that in an oxidation and grafting operation that oxygen functional groups will still remain after the graft copolymerization has been carried out. The oxygen functional groups cause degradation of the polyolefin polymer or graft copolymer to an extent that the polymer or graft copolymer may not be further processed into useful products.

According to the present invention, an oxygenated polymer, such as a graft copolymer, may be admixed in a water solution of a reducing agent. Suitable water-soluble reducing agents are sodium and potassium borohydride; sulfur dioxide; dithionic acid and its salts, such as sodium hyposulfate; dithionous acid and its salts, such as sodium dithionite; sulfurous acid and its salts, such as sodium sulfite and sodium bisulfite; sodium thiosulfate; hyponitrous acid and its salts; acidic solutions of potassium or sodium iodide; and the sulfates and chlorides of ferrous, cobaltous, and cuprous ions.

The oxidized polyolefin or graft copolymer is admixed with the water solution of the reducing agent. The solution may have a concentration of between about 0.2 and 3.0 percent by weight. A preferred concentration is between about 0.5 and 1.0 percent by weight. It was found that about 0.5 to about 5.0 grams of reducing agent per 100 grams of polymer overcame the destructive effects of the oxygen functional groups. A preferred amount of reducing agent used in the process of the present invention is between 1 and 2 grams per 100 grams of oxidized polymer or graft copolymer. The process is carried out at temperatures between 5 and 100° C. with preferred temperatures being between room temperature (20° C.) and 70° C. The oxidized polyolefin or graft copolymer is admixed for 0.5 to 24 hours with the shorter time being used at the elevated temperatures.

DESCRIPTION OF THE PREFERRED EMBODIMENT

The present invention eliminates the destructive degradation to polyolefins caused by oxygen functional groups formed on the polymer chain. The presence of oxygen functional groups will occur merely upon storage of the polyolefin but occurs more rapidly when the polyolefin is intentionally oxidized. The process of the present invention, accordingly, is to treat the polymer having oxygen functional groups with a water solution of a reducing agent so that the polymer may be used in the manufacture of articles, films, fibers, and the like without excessive degradation occurring.

The use of an ozone-oxygen mixture to purposely oxidize the polyolefin is considered to be about as severe a test for producing oxygen functional groups as may be encountered. The use of radiation to oxidize polyolefins has been tried as a procedure to reduce the oxygen attack of the polyolefin. Also oxidation has been used to purposefully reduce the molecular weight of the polyolefin. The process of the present invention may be used after any oxidation of the polyolefin has occurred to enable the polyolefin to be further processed.

The present invention will be illustrated by the following specific examples which are given by way of illustration and not as limitations on the scope of the invention.

Example 1

A suspension was formed with 200 grams of polypropylene (Melt Flow–5.3) and 600 milliliters of water and 6 drops of Sterox AJ. A stream of ozone and oxygen containing 82 mg. of ozone per liter was bubbled through the stirred suspension at a rate of 0.5 liter per minute at room temperature until a total volume of 5 liters had passed through the suspension. The suspension was then flushed with nitrogen to remove unreacted oxygen and ozone. The foregoing was repeated twice more and the oxidized polymer (600 g.) combined. To the suspension of combined oxidized polypropylene was then added 90 g. of freshly distilled 2-vinylpyridine. The suspension was stirred under a nitrogen atmosphere at a temperature at 75° C. for 3 hours. The polymer was cooled on a filter and extracted continuously with hot methanol to remove homopolyvinylpyridine. The final product contained 0.22 percent nitrogen and was 93.4 percent insoluble in boiling normal heptane. The Melt Flow of the graft copolymer was 6.1. The polymer was stabilized with 1.2 g. of a commercial phenolic stabilizer (Ionox 330) per 600 g. of graft copolymer. The graft copolymer was then attempted to be spun but could not due to considerable melt fracture under extrusion conditions.

Example 2

Following the same procedure as in Example 1, 200 g. samples of the same polypropylene (Melt Flow–5.3) were oxidized and combined to be grafted with 80 g. of 2-vinylpyridine per 600 g. of oxidized polymer. The procedure of Example 1 was modified, however, after the grafting at 75° C. for 3 hours by cooling and adding to the suspension dropwise a solution of 5 g. of sodium borohydride in 100 ml. of water and stirring for at least 4 hours. The foregoing was repeated including the treatment with sodium borohydride until 3,000 g. of graft copolymer was produced. The graft copolymer was then spun, drawn, and knitted.

The only distinction between the method used in Examples 1 and 2 is the use of the sodium borohydride reduction which allowed the copolymer to be spun.

Example 3

A suspension of 200 grams of polypropylene and 600 milliliters of water was formed. A stream of ozone and oxygene containing 80 mg. of ozone per liter was bubbled through the stirred suspension at a rate of 0.5 liter per minute at room temperature until a total volume of 10.0 liters had passed through the suspension. Thus, twice the amount of ozone and oxygen was added as that used in Examples 1 and 2. The suspension of 600 g. of oxidized polymer combined by repeating the foregoing was then flushed with nitrogen to remove unreacted oxygen and ozone. Then 80 g. of freshly distilled 2-vinylpyridine was added and the suspension stirred under the nitrogen atmosphere at a temperature of 70° C. for 4 hours. After cooling, a solution of 5 g. of sodium borohydride in 100 ml. of water was added to the graft copolymer suspension and stirred for at least 4 hours.

Repeating the same procedure five times, graft copolymers containing approximately the same percent nitrogen but having Melt Indexes ranging from 8.2 to 12.5 were produced. Four of the 600 grams batches were combined, pelletized, and spun. Some degradation occurred during pellitization and the fiber formed during spinning was weak and could be drawn only at a ratio of 3:1. The fifth 600 gram portion of graft copolymer was reslurried in 100 ml. of water and treated with an additional 15 grams of sodium borohydride. The product was pelletized and spun and drawn at a ratio of 4:1 with no difficulties.

The foregoing illustrates that where the amount of ozone added is of an amount such that considerable oxidation occurs in the oxidation step that the concentration of the sodium borohydride may need to be adjusted to take into account the added oxygen functional groups produced in the oxidation step. Thus the amount of sodium borohydride needed in the reduction is related to the amount of oxidation carried out on the polymer in the first instance.

Example 4

A graft copolymer was producer in the same manner as set forth in Example 3 above. However, instead of reducing the vinylpyridine graft copolymer with sodium borohydride, 30 grams of sodium hydrosulfite was added to a suspension of 600 grams of graft copolymer in two liters of water. The suspension was stirred for 1 hour at 60–70° C. The graft copolymer was filtered, washed with water, methanol, and dried. The graft copolymer contained 3 percent of 2-vinylpyridine grafted onto the polypropylene. The product was pelletized without degradation and successfully spun.

Example 5

The grafting technique was identical to that used in Example 3 with the exception that 150 grams of methylacrylate was used instead of the 2-vinylpyridine. The crude graft copolymer containing some polymethylacrylate was stirred in two liters of acetone for 30 minutes and filtered. The graft copolymer was stirred two additional times with acetone to remove homopolymethylacrylate. The graft copolymer was then suspended in water and stirred with sodium hydrosulfite for 5 hours. The graft copolymer was then filtered, washed with water and methanol, and dried in vacuum after adding 600 milligrams of a stabilizer, Ionox. Analysis showed 82.9 percent carbon and 13.75 percent hydrogen indicating a presence of 9.2 percent methylacrylate in the graft copolymer. The graft copolymer was pelletized, melt spun, and drawn.

By the foregoing examples, the present invention is illustrated under conditions wherein considerable oxygen functional groups are introduced into the polyolefin. The fact that graft copolymerization resulted is indicative that the oxidation resulted in hydroperoxide formation. While it is not completely known precisely what oxygen functional groups remained after graft copolymerization using the conditions of the examples, considerable melt fracture occurred under extrusion conditions, such as would be used in spinning, when the slurrying of the graft copolymer in a solution of reducing agent was not carried out (shown in Example 1). The slurrying of the oxidized polymer or graft copolymer with a water soluble reducing agent in a water slurry allowed the polymer to be further formed at extrusion temperatures into useful products. The ability to be further formed is merely illustrated by the spinability of the graft copolymer.

It is to be understood, however, that the process of the present invention may be carried out on an oxidized polymer wherein the only purpose of the oxidation is to reduce the molecular weight or on an oxidized polymer or graft copolymer which may have been oxidized by a process other than one using an oxygen-ozone mixture.

The nature and objects of the present invention having been completely described and illustrated, what I wish to claim as new and useful and secure by Letters Patent is:

1. In a process for preparing graft copolymers of reduced oxygen functions to enable said polymers to be further formed into useful products wherein a polymer backbone is oxidized, contacted with a monomer, and said monomer polymerized in the presence of the oxidized polymer to produce a graft copolymer, the improvement which comprises:
   admixing said graft coplymer with a water solution consisting essentially of a reducing agent selected from the group consisting of sodium and potassium borohydride; sulfur dioxide; dithionic acid, dithionous acid, sulfurous acid, hyponitrous acid and the ammonium and alkali metal salts of said acids; sodium and potassium thiosulfate; acidic solutions of sodium and potassium iodide, and the sulfates and chlorides of ferrous, cobaltous and cuprous ions.

2. In the process of claim 1 wherein said polymer backbone is a polymer of an alpha olefin.

3. In the process of claim 2 wherein said polymer of an alpha olefin is polypropylene.

4. In a process according to claim 3 wherein said reducing agent is present in a concentration of between about 0.2 and 3.0% by weight.

5. In a process according to claim 3 wherein said reducing agent is sodium borohydride.

6. In a process according to claim 3 wherein said reducing agent is sodium hydrosulfite.

References Cited
UNITED STATES PATENTS

| | | | |
|---|---|---|---|
| 2,965,571 | 12/1960 | Wuellner et al. | 260—877 |
| 3,022,191 | 2/1962 | Cappuccio et al. | 260—877 |
| 3,069,382 | 12/1962 | Nikolov et al. | 260—880 |
| 3,322,661 | 5/1967 | Yoshikawa et al. | 260—877 |

FOREIGN PATENTS 575,403  5/1959  Canada _____ 260—877

MURRAY TILLMAN, Primary Examiner

M. J. TULLY, Assistant Examiner

U.S. Cl. X.R.

260—93.7, 94.9, 877